(12) United States Patent
Lee et al.

(10) Patent No.: US 7,554,498 B1
(45) Date of Patent: Jun. 30, 2009

(54) ANTENNA FOR WWAN

(75) Inventors: Cheng-Han Lee, Kaohsiung (TW); Ching-Chia Mai, Kaohsiung (TW); Wei-Hung Juan, Kaohsiung (TW); Chi-Yueh Wang, Kaohsiung (TW)

(73) Assignee: Yageo Corporation, Kaohsiung (TW)

( * ) Notice: Subject to any disclaimer, the term of this patent is extended or adjusted under 35 U.S.C. 154(b) by 0 days.

(21) Appl. No.: 12/099,806

(22) Filed: Apr. 9, 2008

(30) Foreign Application Priority Data

Dec. 26, 2007 (TW) .............................. 96150367 A

(51) Int. Cl.
*H01Q 1/24* (2006.01)

(52) U.S. Cl. .............................. 343/702; 343/700 MS; 343/846

(58) Field of Classification Search .......... 343/700 MS, 343/702, 846, 829
See application file for complete search history.

(56) References Cited

U.S. PATENT DOCUMENTS

| | | | |
|---|---|---|---|
| 6,339,400 B1 | 1/2002 | Flint et al. | |
| 6,424,304 B1 * | 7/2002 | Jan et al. | 343/702 |
| 6,606,071 B2 * | 8/2003 | Cheng et al. | 343/767 |
| 6,724,348 B2 * | 4/2004 | Fang | 343/702 |
| 6,781,546 B2 * | 8/2004 | Wang et al. | 343/700 MS |
| 6,809,690 B2 * | 10/2004 | Tao | 343/702 |
| 7,050,010 B2 * | 5/2006 | Wang et al. | 343/702 |

* cited by examiner

*Primary Examiner*—Tho G Phan
(74) *Attorney, Agent, or Firm*—Volentine & Whitt, PLLC

(57) ABSTRACT

An antenna for WWAN is disclosed, which includes a first radiating metal strip, a second radiating metal strip, a first ground strip, a connecting metal strip and a second ground strip. The first radiating metal strip has a first portion and a second portion. The second radiating metal strip is independent. The first portion is coupled with the second radiating metal strip to induce a first resonance. The second portion cooperates with the second radiating metal strip to induce a second resonance. The connecting metal strip connects the first radiating metal strip to the first ground strip. The second ground strip is independent. The ground strips are used for grounding effect and can be selectively connected to a ground end of a wireless electronic device. Therefore, the antenna can be mounted in any place of the wireless electronic device, and has stable electrical characteristic.

20 Claims, 4 Drawing Sheets

ANTENNA FOR WWAN

BACKGROUND OF THE INVENTION

1. Field of the Invention

The present invention relates to an antenna for a wireless network, more particularly, to an antenna for WWAN.

2. Description of the Related Art

With the rapid development of the wireless communication technology, various multi-frequency communication products are put forward one after another, and thus the wireless communication products have become part of the daily life. Almost all new products are provided with wireless transmission function to meet the demands of the public. The notebook computer always needs data transmission which is simple in wiring and setting. In order to enable wireless transmission, an antenna is necessary. However, appearance, size, and performance are critical factors if notebook computers having wireless transmission function are to be widely accepted by the market. Therefore, better design and allocation of the antenna is important.

In the conventional antenna allocation for the notebook computer, as disclosed in, e.g., U.S. Pat. No. 6,339,400B1, one or more antennas 11, 12 are disposed around a screen 10 of a notebook computer 1, as shown in FIG. 1. However, since the ground end of the antennas 11, 12 must be connected to the ground of the screen or the frame of the screen, the conventional antenna allocation is limited by the mounting position and cannot be freely adjusted. Moreover, the antennas 11, 12 can only be used for WLAN. Therefore, it is necessary to provide an innovative and inventive antenna for WWAN to solve the above problems.

SUMMARY OF THE INVENTION

The present invention is directed to an antenna for WWAN, which includes a first radiating metal strip, a second radiating metal strip, a first ground strip, a connecting metal strip, a second ground strip and at least one support element. The first radiating metal strip includes a first portion and a second portion. The second radiating metal strip is independent. The first portion is coupled with the second radiating metal strip to induce a first resonance. The second portion cooperates with the second radiating metal strip to induce a second resonance. The connecting metal strip connects the first radiating metal strip to the first ground strip. The second ground strip is independent, and does not connect the first ground strip and the second radiating metal strip. The support element is used to support the first radiating metal strip, the second radiating metal strip and the second ground strip.

The antenna of the present invention is small and can be mounted within a wireless electronic device. The ground strips of the antenna can independently provide the grounding effect and can be selectively connected to a ground end of the wireless electronic device, so the mounting of the antenna of the present invention is more flexible, and a stable electrical characteristic can also be maintained.

In the antenna of the present invention, the second ground strip does not connect to the first ground strip, thereby adding the paths when the second ground strip connects to ground.

DETAILED DESCRIPTION OF THE INVENTION

Figure 1:
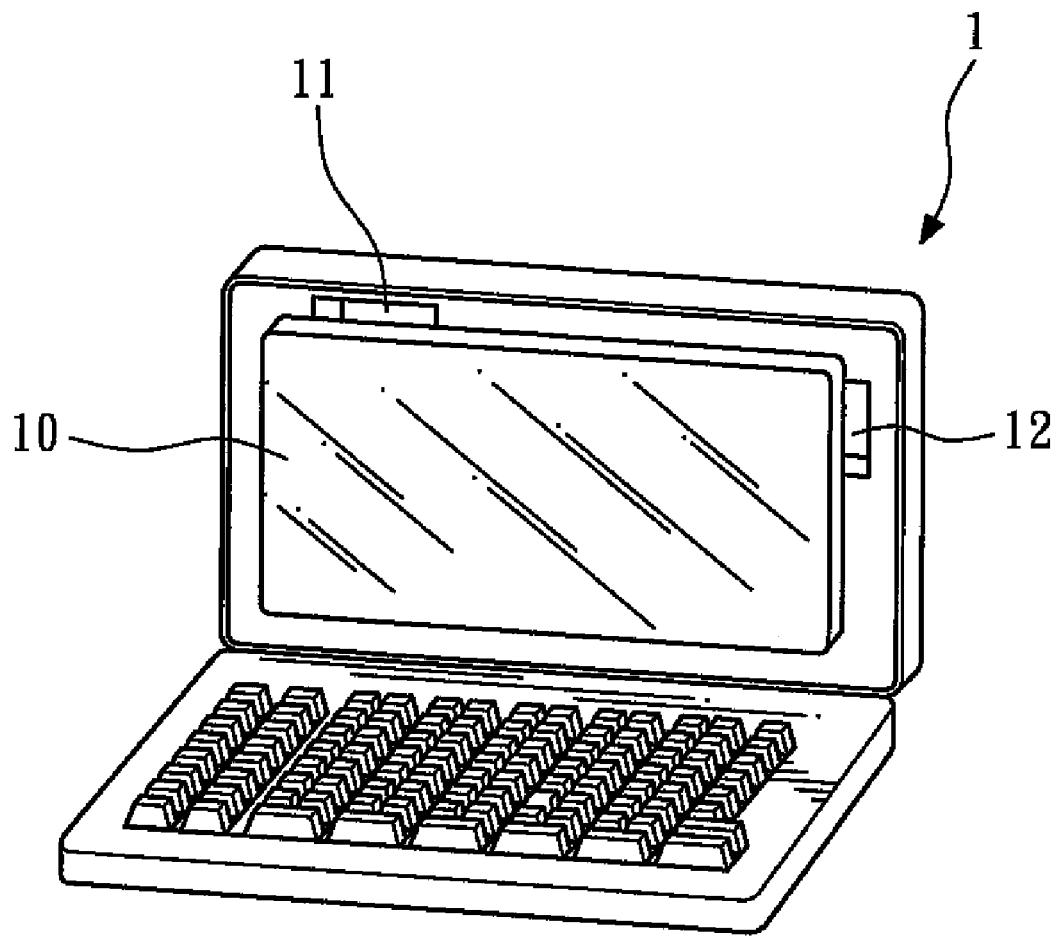
FIG. 1 is a schematic view of a conventional antenna disposed around a screen of a notebook computer.
Figure 2A:
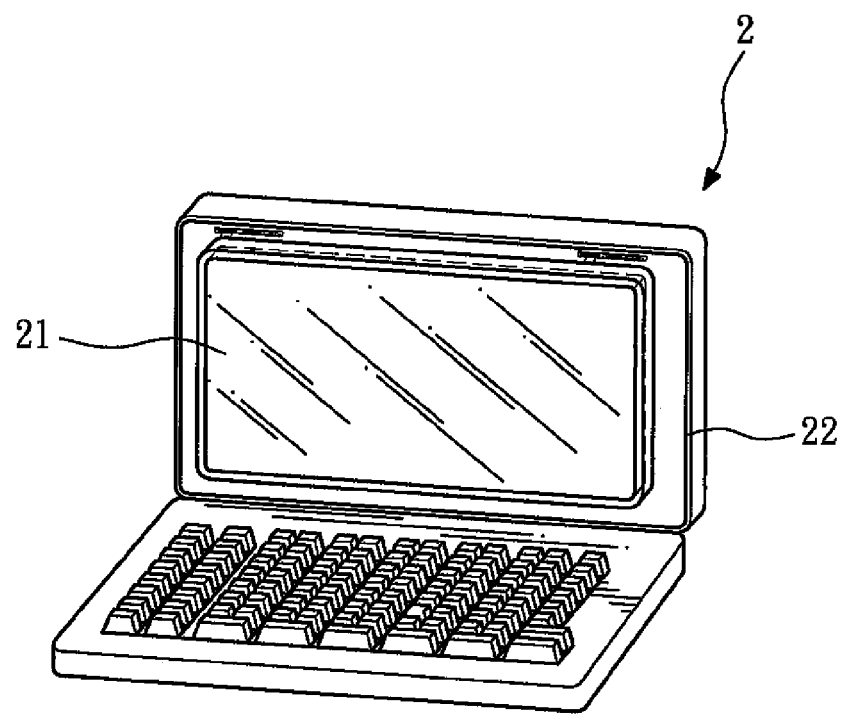
FIG. 2A is a schematic view of an antenna disposed on a screen housing frame of a notebook computer according to the present invention.
Figure 2B:
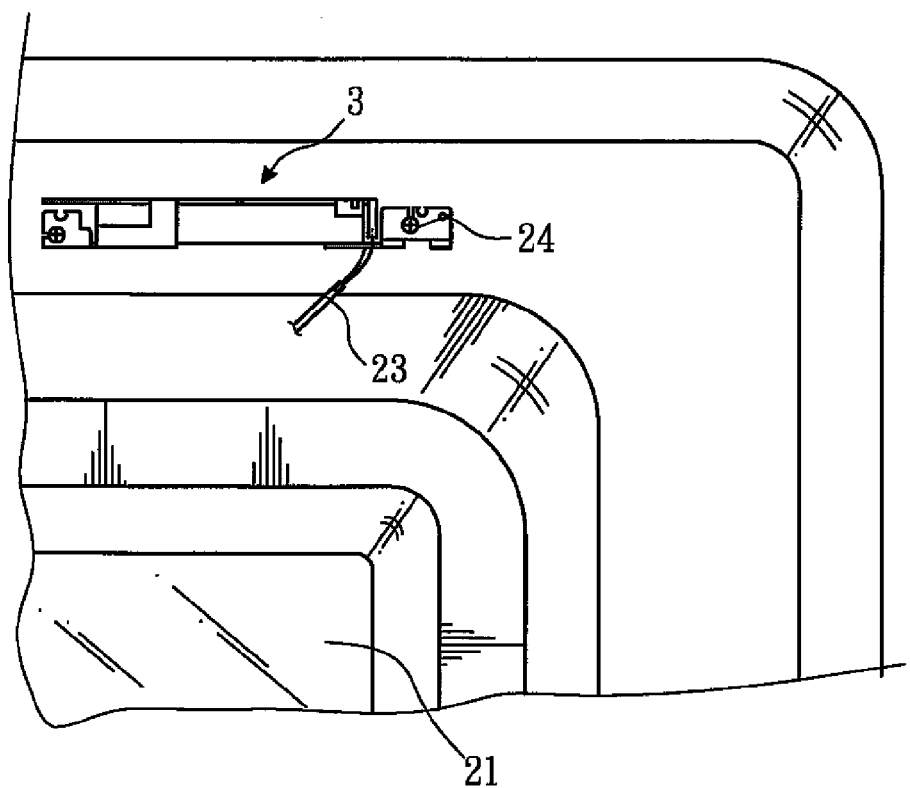
FIG. 2B is a partially enlarged schematic view of the antenna disposed on the screen housing frame of the notebook computer according to the present invention.

FIGS. 2A and 2B show allocation of the antenna in a notebook computer 2 according to the present invention. The antenna in the present invention can be used in various wireless electronic devices including, but not limited to, the notebook computer. Common electronic products such as PDAs may also use the antenna of the present invention to enable wireless communication. The notebook computer 2 has a screen 21 and a screen housing frame 22. The antenna 3 of the present invention (for example, the antenna 3 in the first embodiment, as shown in FIG. 3) is disposed in the screen housing frame 22 of the notebook computer 2, and a coaxial wire 23 connects the antenna 3 to a control circuit of the notebook computer 2, so as to transmit data through the antenna 3.

The antenna 3 has at least one fixing portion for fixing the antenna 3 to the screen housing frame 22. In this embodiment, the fixing portion is two through holes (including a first through hole 332 and a second through hole 352) (as shown in FIG. 3), for two screws 24 to fix the antenna 3 to the screen housing frame 22 of the notebook computer 2 (as shown in FIG. 2B).

Figure 3:
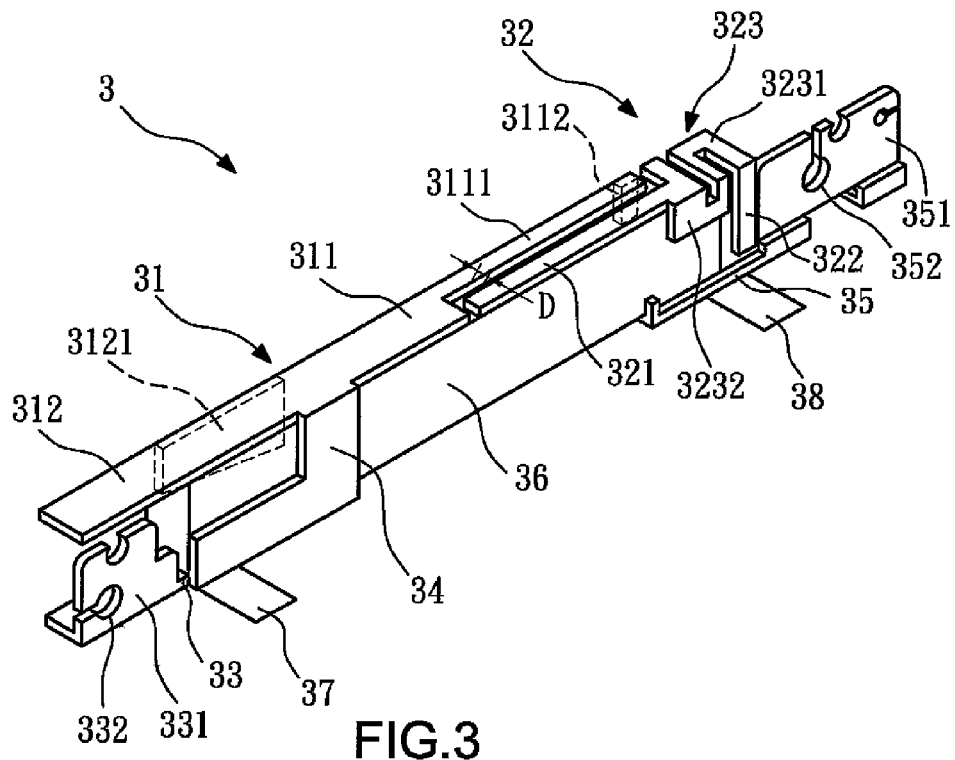
FIG. 3 is a schematic perspective view of an antenna for WWAN according to a first embodiment of the present invention.
Figure 4:
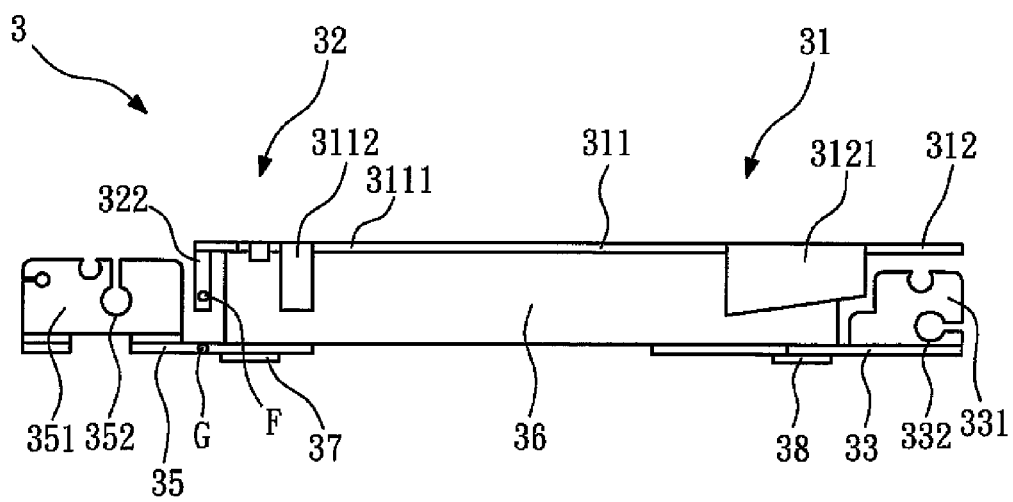
FIG. 4 is a schematic back view of the antenna for WWAN according to the first embodiment of the present invention.
Figure 5:
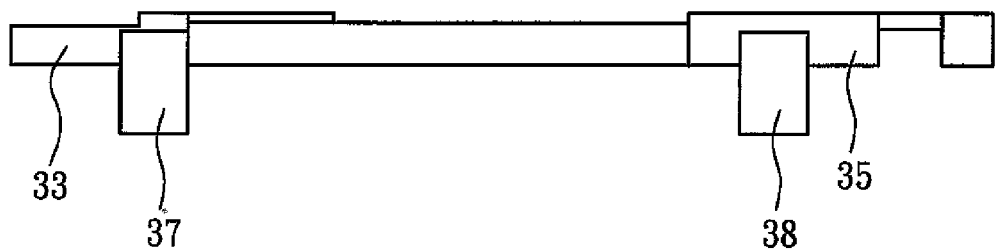
FIG. 5 is a schematic bottom view of the antenna for WWAN according to the first embodiment of the present invention.

FIGS. 3, 4, and 5 show the antenna for WWAN according to the first embodiment of the present invention. The antenna 3 includes a first radiating metal strip 31, a second radiating metal strip 32, a first ground strip 33, a connecting metal strip 34, a second ground strip 35 and at least one support element 36.

The first radiating metal strip 31 includes a first portion 311 and a second portion 312. The first portion 311 and the second portion 312 extend in opposite directions, so that the first radiating metal strip 31 and the connecting metal strip 34 are in a T shape. The first portion 311 includes an extending portion 3111, and the length of the first portion 311 and the extending portion 3111 of the first portion 311 is greater than that of the second portion 312. The first portion 311, the extending portion 3111 and the second portion 312 are located on the top surface of the antenna 3. The second portion 312 further includes a gain extending portion 3121 which extends to a second side (back side) of the antenna 3 so as to increase the bandwidth. The second side is perpendicular to the top surface. Preferably, the first portion 311 further includes a protrusion 3112 which extends from the extending portion 3111 to the second side of the antenna 3, so as to add to the paths of the first portion 311.

The second radiating metal strip 32 is independent, i.e., the second radiating metal strip 32 does not connect the first radiating metal strip 31 and the second ground strip 35. The first portion 311 is coupled with the second radiating metal strip 32 to induce a first resonance. The second portion 312 cooperates with the second radiating metal strip 32 to induce a second resonance. In this embodiment, the second radiating metal strip 32 includes a third portion 321 and a fourth portion 322. The third portion 321 is located on a top surface of the antenna 3. The fourth portion 322 is located on a first side (front side) of the antenna 3. The top surface is perpendicular to the first side, and thus the third portion 321 is perpendicular to the fourth portion 322.

The third portion 321 is parallel to and a distance D from the extending portion 3111 of the first portion 311. The distance D is between 0.2 mm and 2 mm. The third portion 321 is coupled with the extending portion 3111 of the first portion 311 to induce a first resonance. The second portion 312 cooperates with the second radiating metal strip 32 to induce a second resonance. The first resonance has a frequency between 824 MHz and 960 MHz, and the second resonance has a frequency of 1575 MHz and between 1710 MHz and 2170 MHz.

In this embodiment, the second radiating metal strip 32 further includes a connecting portion 323 for connecting the third portion 321 and the fourth portion 322. However, it is understood that the third portion 321 may be directly connected to the fourth portion 322. In this embodiment, the connecting portion 323 includes a first connecting portion 3231 and a second connecting portion 3232. The first connecting portion 3231 connects the fourth portion 322 and the second connecting portion 3232, and the second connecting portion 3232 connects the first connecting portion 3231 and the third portion 321. The first connecting portion 3231 is located on the top surface of the antenna 3, and the second connecting portion 3232 is located on a first side of the antenna 3. Preferably, the first connecting portion 3231 and the second connecting portion 3232 are in a U shape, thereby adding to the paths of the second radiating metal strip 32.

The first ground strip 33 is located on a bottom surface of the antenna 3, and the bottom surface is opposite to the top surface. Preferably, the first ground strip 33 further includes a first fixing piece 331 extending upward and having a first through hole 332.

The connecting metal strip 34 is used to connect the first radiating metal strip 31 to the first ground strip 33, and the connecting metal strip 34 is located on the first side of the antenna 3. In this embodiment, the connecting metal strip 34 is in an L shape.

The second ground strip 35 is independent, i.e., the second ground strip 35 does not connect the first ground strip 33 and the second radiating metal strip 32, so as to add to the paths for grounding. The second ground strip 35 is located on the bottom surface of the antenna 3. Preferably, the second ground strip 35 further includes a second fixing piece 351 extending upward and having a second through hole 352.

The support element 36 is an insulating element which is used to support the first radiating metal strip 31, the second radiating metal strip 32 and the second ground strip 35. In this embodiment, the support element 36 is a cuboid structure, and the first portion 311 and the extending portion 3111 of the first radiating metal strip 31, the third portion 321 and the second connecting portion 3232 of the second radiating metal strip 32, and the second ground strip 35 are adhered to the support element 36.

Preferably, the antenna 3 further includes a first auxiliary ground element 37 and a second auxiliary ground element 38. The first auxiliary ground element 37 is electrically connected to the first ground strip 33, and the second auxiliary ground element 38 is electrically connected to the second ground strip 35. The first auxiliary ground element 37 and the second auxiliary ground element 38 are made of aluminum foil, conductive adhesive, or conductive foam. The auxiliary ground elements 37, 38 are separated at a distance. The auxiliary ground elements 37, 38 are foldable, so as to save space and provide better grounding and radiating effects. As shown in FIG. 4, the fourth portion 322 has a feed-in point F at the lower end. The second ground strip 35 has a ground point G in a position corresponding to the feed-in point P. The feed-in point F and the ground point G are electrically connected to a coaxial wire 23 (FIG. 2B). The coaxial wire 23 connects the antenna 3 to a control circuit of the notebook computer 2, receives wireless signals via the feed-in point F, and transmits the signals to the control circuit of the notebook computer 2.

The antenna of the present invention can be used for WWAN, and can be disposed in a wireless electronic device because it is small.

Furthermore, the ground strips and auxiliary ground elements of the antenna can provide the grounding effect independently, and may be selectively connected to the ground end of the wireless electronic device, so the mounting of the antenna of the present invention is more flexible, and a stable electrical characteristic can be maintained.

Figure 6:
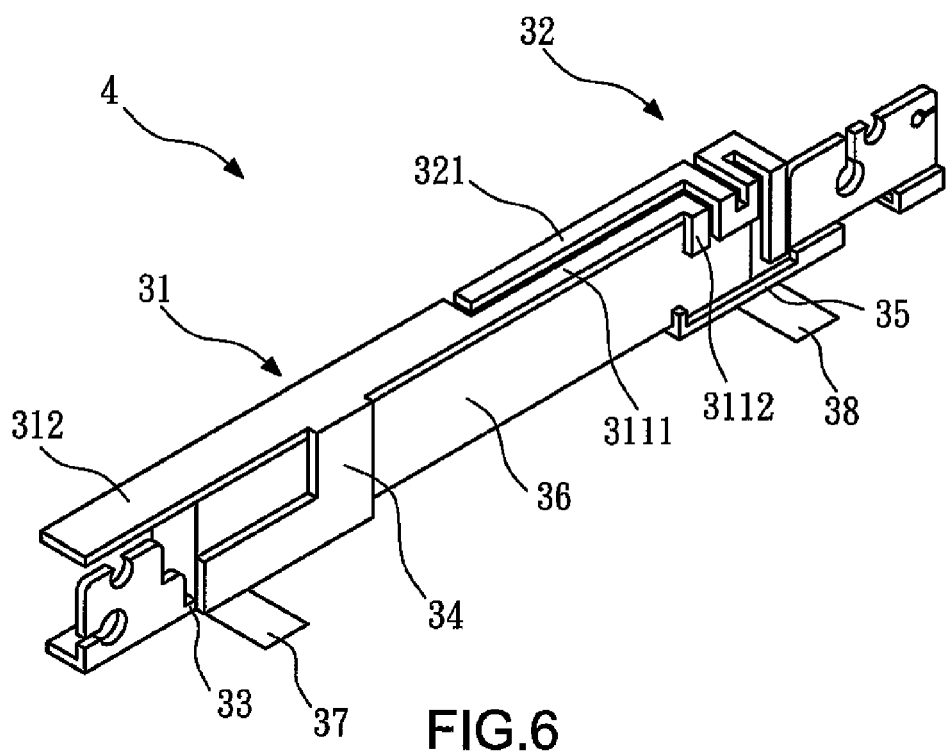
FIG. 6 is a schematic perspective view of an antenna for WWAN according to a second embodiment of the present invention.

FIG. 6 shows an antenna for WWAN according to a second embodiment of the present invention. The antenna 4 is substantially the same as the antenna 3 (FIG. 3) of the first embodiment, except in the relative position of the extending portion 3111 and the third portion 321.

While, in the antenna 3 of the first embodiment, the third portion 321 is located on a front side of the extending portion 3111, the third portion 321 in the antenna 4 of this embodiment is located on the back side of the extending portion 3111, and the protrusion 3112 is located on the first side (front side) of the antenna 3.

While several embodiments of the present invention have been illustrated and described, various modifications and improvements can be made by those skilled in the art. The embodiments of the present invention are therefore described in an illustrative but not restrictive sense. It is intended that the present invention should not be limited to the particular forms as illustrated, and that all modifications which maintain the spirit and scope of the present invention are within the scope defined by the appended claims.

What is claimed is:

1. An antenna for WWAN, comprising:
   a first radiating metal strip, having a first portion and a second portion;
   a second radiating metal strip, being an independent metal strip, wherein the first portion is coupled with the second radiating metal strip to induce a first resonance, and the second portion cooperates with the second radiating metal strip to induce a second resonance;
   a first ground strip;
   a connecting metal strip, for connecting the first radiating metal strip to the first ground strip;
   a second ground strip, being and independent metal strip, wherein the second ground strip does not connect the first ground strip and the second radiating metal strip; and
   at least one support element, for supporting the first radiating metal strip, the second radiating metal strip, and the second ground strip.

2. The antenna according to claim 1, wherein the first resonance has a frequency between 824 MHz and 960 MHz, and the second resonance has a frequency of 1575 MHz and between 1710 MHz and 2170 MHz.

3. The antenna according to claim 1, wherein the support element is an insulating element.

4. The antenna according to claim 1, wherein the first portion and the second portion extend in different directions, so that the first radiating metal strip and the connecting metal strip are in a T shape.

5. The antenna according to claim 1, wherein the first portion comprises an extending portion, the second radiating metal strip comprises a third portion and a fourth portion, the third portion is perpendicular to the fourth portion, and the extending portion of the first portion is parallel to and a distance from the third portion.

6. The antenna according to claim 5, wherein the second portion, the extending portion of the first portion and the third portion are located on a top surface of the antenna, the fourth portion is located on a first side of the antenna, and the top surface is perpendicular to the first side.

7. The antenna according to claim 5, wherein the distance is between 0.2 mm and 2 mm.

8. The antenna according to claim 5, wherein the second radiating metal strip further comprises a connecting portion for connecting the third portion and the fourth portion.

9. The antenna according to claim 8, wherein the connecting portion comprises a first connecting portion and a second connecting portion, the first connecting portion is used to connect the fourth portion and the second connecting portion, and the second connecting portion is used to connect the first connecting portion and the third portion.

10. The antenna according to claim 9, wherein the second portion, the extending portion of the first portion, the third portion and the first connecting portion are located on a top surface of the antenna, the fourth portion and the second connecting portion are located on a first side of the antenna, and the top surface is perpendicular to the first side.

11. The antenna according to claim 9, wherein the first connecting portion and the second connecting portion are in a U shape.

12. The antenna according to claim 1, wherein the first portion and the second portion are located on a top surface of the antenna, the first ground strip and the second ground strip are located on a bottom surface of the antenna, and the top surface is opposite to the bottom surface.

13. The antenna according to claim 12, wherein the connecting metal strip is located on a first side of the antenna, and the top surface is perpendicular to the first side.

14. The antenna according to claim 12, wherein the first portion further comprises an extending portion, the second radiating metal strip comprises a third portion, a fourth portion, a first connecting portion and a second connecting portion, the extending portion of the first portion is parallel to and a distance from the third portion, the first connecting portion connects the fourth portion and the second connecting portion, the second connecting portion connects the first connecting portion and the third portion, the extending portion of the first portion, the third portion and the first connecting portion are located on a top surface of the antenna, and the fourth portion and the second connecting portion are located on a first side of the antenna.

15. The antenna according to claim 14, wherein the fourth portion has a feed-in point, the second ground strip has a ground point in a position corresponding to the feed-in point, and the feed-in point and the ground point are electrically connected to a coaxial wire.

16. The antenna according to claim 12, wherein the second portion further comprises a gain extending portion extending to a second side of the antenna, and the second side is perpendicular to the top surface.

17. The antenna according to claim 1, wherein the first portion comprises an extending portion, and the length of the first portion and the extending portion of the first portion is greater than that of the second portion.

18. The antenna according to claim 1, wherein the first radiating metal strip, the second radiating metal strip and the second ground strip are adhered to the support element.

19. The antenna according to claim 1, further comprising a first auxiliary ground element and a second auxiliary ground element, wherein the first auxiliary ground element is electrically connected to the first ground strip, and the second auxiliary ground element is electrically connected to the second ground strip.

20. The antenna according to claim 19, wherein the first auxiliary ground element and the second auxiliary ground element are made of aluminum foil, conductive adhesive, or conductive foam.

* * * * *